US012646029B1

(12) United States Patent
Henderson et al.

(10) Patent No.: US 12,646,029 B1
(45) Date of Patent: Jun. 2, 2026

(54) INDEXING AN AREA OF INTEREST USING LAYERED CONSTRAINTS

(71) Applicant: Amazon Technologies, Inc., Seattle, WA (US)

(72) Inventors: Dale Lawrence Henderson, Star, ID (US); Chad Sanford, Southlake, TX (US); Mohammad Abouali, Canton, MI (US); Marshall Peng, Seattle, WA (US); Maryam Mourad Amer, Carlsbad, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/446,928

(22) Filed: Aug. 9, 2023

(51) Int. Cl.
*G06Q 10/083* (2024.01)

(52) U.S. Cl.
CPC ................................. *G06Q 10/0838* (2013.01)

(58) Field of Classification Search
CPC ............ G06Q 10/0833; G06Q 10/087; G06Q 10/083; G06Q 10/0832; G06Q 10/0838; G06Q 10/08; G06Q 10/08355; G06Q 10/0835; G01C 21/3407; G01C 21/20; G01C 21/3415; G01C 21/3461; G01C 21/3889; G01C 21/3804; G01C 21/30; G01C 21/34
See application file for complete search history.

(56) References Cited

U.S. PATENT DOCUMENTS 9,262,929 B1 * 2/2016 Roy ........................ G08G 5/006
9,542,849 B1 * 1/2017 Bertram ............... G08G 5/0086

9,592,912 B1 * 3/2017 Michini ............... G05D 1/0094
9,743,239 B1 * 8/2017 Mishra .................. H04W 4/023
9,953,540 B2 * 4/2018 Macfarlane ............ G08G 5/006
2021/0173415 A1 * 6/2021 Cajias ................... G06T 3/4053
2021/0225176 A1 * 7/2021 Kusumi ............... G08G 5/0013
2023/0035682 A1 * 2/2023 Seo ....................... G08G 5/0069

OTHER PUBLICATIONS

B. Alkouz, B. Shahzaad and A. Bouguettaya, "Service-Based Drone Delivery," 2021 IEEE 7th International Conference on Collaboration and Internet Computing (CIC), Atlanta, GA, USA, 2021, pp. 68-76, doi: 10.1109/CIC52973.2021.00019 (Year: 2021).*
Esri, "The general suitability modeling workflow, ArcGIS Pro 3.1," www.esri.com, Esri, ArcGIS Pro, URL: https://pro.Arcgis.com/en/pro-app/latest/help/analysis/spatial-analyst/suitability-modeler/the-general-suitability-modeling-workflow.htm, accessed Jul. 27, 2023, 3 pages.

* cited by examiner

*Primary Examiner* — Michael P Harrington
(74) *Attorney, Agent, or Firm* — Athorus, PLLC

(57) ABSTRACT

Described are example systems and methods generally directed to determining a location score in connection with a geographic area of interest that may represent a suitability of the geographic area of interest in connection with the performance of a service. A geographic area of interest is divided into a plurality of cells and one or more constraints in connection with an area of interest (or combination of multiple areas of interest, etc.) is determined, a mapping function is defined for each constraint, and the constraints in determining a location score for each cell of the area of interest is aggregated. In exemplary implementations, the location score for each cell of the area of interest may represent and/or correspond to a suitability of the area of interest in connection with performing aerial deliveries of items using an aerial vehicle.

20 Claims, 12 Drawing Sheets

INDEXING AN AREA OF INTEREST USING LAYERED CONSTRAINTS

BACKGROUND

Determining the geographic feasibility, viability, and/or suitability of an area and/or location in connection with a service can be important in deciding whether to initiate and/or continue offering the service. Accordingly, making such determinations regarding the feasibility and/or suitability of a geographic area in connection with the service can be vital in the likelihood of success of the service within the geographic area. Further, prior to performing a detailed analysis of various geographic areas, it may be desirable to efficiently determine an estimated feasibility and/or suitability of various geographic areas, so as to eliminate certain geographic areas from further consideration and/or to identify particular geographic areas that may be candidates for a more in depth and/or detailed analysis.

DETAILED DESCRIPTION

Figure 1:
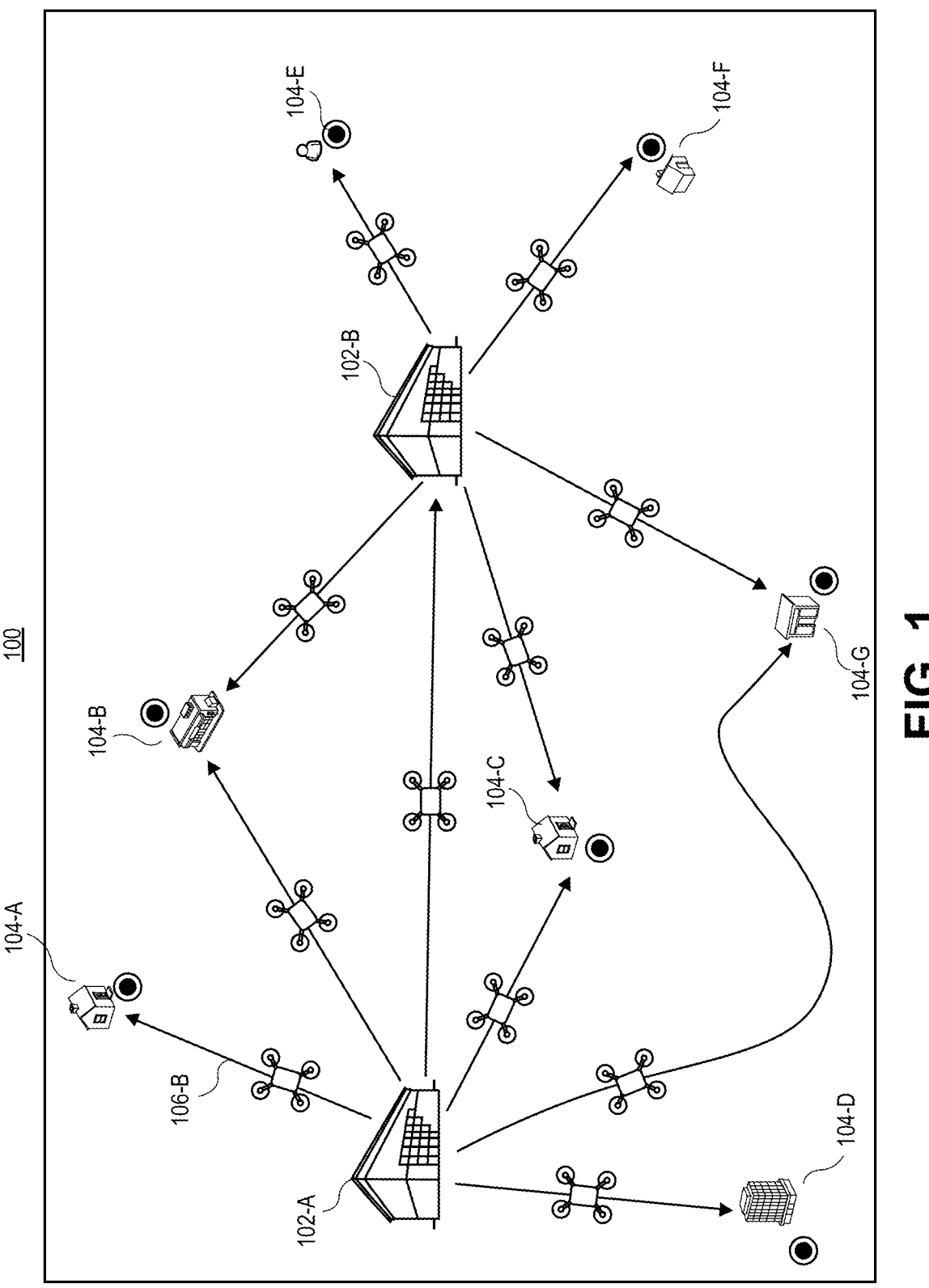
FIG. 1 is an illustration of an exemplary environment in which aerial deliveries may be performed, according to exemplary embodiments of the present disclosure.

As is set forth in greater detail below, embodiments of the present disclosure are generally directed to systems and methods for determining a location score in connection with a geographic area of interest that may represent a suitability of the geographic area of interest in connection with the performance of a service. For example, exemplary embodiments of the present disclosure can divide a geographic area of interest into a plurality of cells and determine one or more constraints in connection with an area of interest (or combination of multiple areas of interest, etc.), define a mapping function for each constraint, and aggregate the constraints in determining a location score for each cell of the area of interest. In exemplary implementations, the location score for each cell of the area of interest may represent and/or correspond to a suitability of the area of interest in connection with performing aerial deliveries of items using an aerial vehicle.

According to exemplary embodiments of the present disclosure, the location score may be determined based on one or more constraints that may be determined and defined in accordance with their respective mapping functions. Further, the size of each cell, as well as the constraints and/or the respective mapping functions defining the constraints, may be determined in view of parameters and/or considerations associated with the service for which the location score is being determined. For example, in the exemplary implementation where the location score is being employed in connection with the suitability for performing aerial delivery of items in certain areas of interest, the cells, constraints and/or the mapping functions defining the constraints may be determined in view of capabilities of the aerial vehicle performing the aerial delivery, logistics of performing an aerial delivery, safety considerations, airspace considerations, infrastructure considerations, and the like. In an exemplary implementation, each cell may include equally sized (e.g., 0.25 km², 0.5 km², 1.0 km², etc.) circular or polygonal areas (e.g., triangles, rectangles, pentagons, hexagons, etc.) and the constraints may include population density, weather, airspace classifications, infrastructure classifications, elevation, elevational changes, vegetation, and the like. Further, the mapping functions defining each constraint may include, for example, a linear function, a piece-wise linear function, a rule-based constant function, an exponential function, a logarithmic function, a quadratic function, a polynomial function, a sinusoidal function, etc. Accordingly, the various constraints, as defined by their respective mapping functions, may be aggregated for the cells of the one or more areas of interest to determine location scores for the one or more areas of interest. The location scores for the one or more areas of interest may be returned (e.g., as a map graphically representing the location scores of the areas of interest) and/or provided to downstream systems and/or processes for further processing.

In an exemplary implementation of the present disclosure, a request for a location score in connection with one or more areas of interest for a service to be provided may be received from a user. For example, a user may identify one or more areas of interest for which a location score may be generated. In connection with identifying an area of interest for which a location score is to be determined, the user may specify certain input parameters (e.g., selecting a predetermined area of interest, specifying a customized area of interest, specifying an output type, specifying certain constraints to be included and/or excluded, parameters associated with the service to be provided, changing other variables, etc.) associated with the request for a location score. This can facilitate, for example, efficient comparisons between multiple areas of interest in assessing the suitability of the various areas of interest while applying the same input parameters to the various areas of interest. Further, the input parameters may be used as a feedback loop, which may be used to determine constraints, mapping functions, and/or other considerations that may be used in determining the suitability of areas of interest in connection with a particular service.

According to exemplary embodiments of the present disclosure, the areas of interest may be divided into cells, and one or more constraints, as defined by their respective mapping functions, may be applied and aggregated to each cell of the areas of interest specified by the user to generate location scores for each cell of the areas of interest. In an exemplary implementation where the location score is being employed in connection with the suitability for performing aerial delivery of items in certain areas of interest, the location scores may be provided to a user as a map that may graphically represent the location scores associated with the areas of interest, a percentage of the population that may be able to receive aerial delivery of items, location scores that exceed a threshold value, and the like. Alternatively and/or in addition, exemplary embodiments of the present disclosure may provide the location scores based on geographical parameters (e.g., latitude, longitude, postal codes, town/city/county/state/country boundaries, and the like). Further, the location scores may optionally be provided to further downstream systems and/or processes which may process the location scores and/or areas of interest to further determine a suitability of the areas of interest for the intended service.

While the exemplary embodiments discussed herein are primarily described with respect to aerial vehicles and aerial deliveries, embodiments of the present disclosure can be applicable to determining the suitability of any geographic area in connection with any service to be provided. For example, embodiments of the present disclosure can be applicable to launching and/or continuing a service in a geographic area, opening a facility (e.g., store, warehouse, transportation stops, etc.) in a geographic area, determining a location for governmental buildings, and the like.

FIG. 1 illustrates an exemplary environment 100 in which aerial deliveries may be performed, according to exemplary embodiments of the present disclosure.

As shown in FIG. 1, aerial deliveries may be performed in exemplary environment 100 between source locations 102 and delivery destinations 104. In exemplary environment 100, source locations 102-A and 102-B can include any facility where items to be delivered may originate, such as materials handling facilities, a warehouse, a fulfillment center, a retail location, etc. Further, delivery destinations 104-A, 104-B, 104-C, 104-D, 104-E, 104-F, and 104-G can include any location to which an item may be delivered, and may include a residential property, a commercial property, a multi-unit residential property, an office, another materials handling facility, such as a warehouse, fulfillment center, retail location, etc.

FIG. 1 also illustrates various exemplary flight paths/routes that aerial vehicles, such as unmanned aerial vehicles (UAVs) may follow in performing aerial delivery of packages and/or items. The term "flight path," as used herein, may include any segment and/or portion of a flight path and may specify ranges or areas regarding heading, speed, altitude, coordinates, etc. that an aerial vehicle may follow as it navigates a corresponding flight path. The one or more flight paths/routes may be determined in view of various flight parameters, such as ground risk, vehicle risk, restricted/prohibited airspace, weather conditions, aerial vehicle capabilities, etc. associated with delivery mission to be performed by an aerial vehicle as it aerially navigates between a source location 102 and a delivery destination 104.

In exemplary implementations, exemplary embodiments of the present disclosure may have been employed in determining that exemplary environment 100 was suitable for performing aerial delivery of items. For example, location scores may have been determined according to exemplary embodiments of the present disclosure in connection with exemplary environment 100 prior to initiating and/or continuing aerial delivery services in connection with exemplary environment 100. In an exemplary implementation, a location score determined and associated with a particular area may include a value between zero and one that represents a likelihood that a person within the particular area is able to receive an item via aerial delivery.

In determining the location scores in connection with exemplary environment 100, environment 100 may have been identified as an area of interest and divided into a plurality of cells. The shape and size of each cell may be based on parameters associated with the service for which the location scores are being generated. Alternatively and/or in addition, the cells and/or the area of interest may be defined by a user input, terrain characteristics (e.g., mountains, elevational changes, level terrain, forested areas, roadways, etc.), geographical parameters (e.g., postal codes, town boundaries, state boundaries, etc.). In an exemplary implementation where location scores are being determined in connection with determining the suitability of exemplary environment 100 for performing aerial delivery of items, each cell may include a rectangular area of 1.0 $km^2$. Embodiments of the present disclosure contemplate cells of other shapes (e.g., circular, triangular, rhombus, pentagons, hexagons, etc.) and sizes (e.g., 0.25 $km^2$, 0.5 $km^2$, 0.75 $km^2$, 1.5 $km^2$, etc.). After dividing the area of interest into a plurality of cells, one or more constraints, as defined by their respective mapping functions, may have been applied and aggregated in connection with exemplary environment 100 to determine location scores for each cell.

According to aspects of the present disclosure, the applied constraints may include an initial constraint based on the population of each cell of exemplary environment 100. For example, the population density of each cell may be computed and a mapping function that maps the population density to a location score may be applied. According to an exemplary implementation of the present disclosure, a piecewise linear mapping function that defines various breakpoints as tuples of population density and location score may be determined and applied. The piecewise linear mapping function may be determined based on parameters and considerations associated with the service under consideration for the area of interest. For example, in connection with determining location scores for assessing the suitability of performing aerial delivery of items, the capabilities of the aerial vehicle (e.g., maximum altitude, required landing radius, etc.), the logistics of performing an aerial delivery, the safety of performing an aerial delivery, and the like may be considered in determining the mapping function. In view of these parameters and considerations, it may be assumed that aerial delivery of items may become increasingly difficult as the population density of an area increases.

Accordingly, the piecewise linear mapping function that maps the population density to the location scores may define a respective location score for various population density thresholds based on the various parameters associated with the contemplated service. In one exemplary implementation, the piecewise linear mapping function may assign an initial location score of 1.0 (e.g., 100% likelihood that aerial delivery is possible) to a population density of 0 (e.g., no population density may indicate a rural area where aerial delivery may be easily performed), an initial location score of 0 (e.g., 0% likelihood of aerial delivery) may be assigned to a population density above a certain threshold (e.g., above 10,000 people/$m^2$, 12,000 people/$m^2$, 15,000 people/$m^2$, etc.—a high population density may indicate difficulty in safely performing aerial delivery in view of infrastructure, number of people, availability of potential delivery locations, etc.), and various other initial location scores (e.g., 0.95, 0.90, 0.85, 0.80, 0.75, 0.50, 0.25, etc.) may be assigned to various other corresponding thresholds of population density (e.g., 1,000 people/$m^2$, 1,500 people/$m^2$, 2,000 people/$m^2$, 2,500 people/$m^2$, etc.). Aspects of the present disclosure contemplate any number of location score breakpoints at any number of population density thresholds. The location scores determined based on the initial population density constraint may be considered to be an initial and/or baseline location score.

In addition to the initial constraint based on population density, additional constraints may also be utilized to further determine the location scores. For example, each additional constraint may be applied, so that a location score may be determined for each cell of an area of interest that is an aggregation of all the various constraints. The additional constraints, along with their respective associated mapping functions, may also be determined based on parameters and considerations associated with the service under consideration for the area of interest. According to aspects of the present disclosure, the additional constraints may include and/or be based on information such as vegetation and/or ground cover information (e.g., type of vegetational ground cover and ground cover percentage, etc.), terrain classifications (e.g., difference between minimum and maximum elevations of the area, etc.), weather information (e.g., precipitation, temperature, wind, visibility, etc.), airspace classification information (e.g., restricted airspace, prohibited airspace, etc.), infrastructure classification information (e.g., national parks, prisons, schools, universities, houses of worship, sporting venues, manufacturing facilities, hospitals, electrical grid infrastructure, water infrastructure, etc.).

Further, each additional constraint may also include a respective mapping function. According to aspects of the present disclosure, each respective mapping function may include a corresponding piecewise linear function, a linear function, a constant function, an exponential function, a logarithmic function, a quadratic function, a polynomial function, a sinusoidal function, and the like. For example, the constant functions may include a zero function in connection with a prohibited area constraint for areas that correspond to prohibited airspace (e.g., over military bases, over the White House, over nuclear power plants, etc.) and a unity constant function in connection with a known permitted areas for areas that correspond to areas where aerial delivery arrangements have been made (e.g., universities, multi-unit residential properties, commercial properties, etc.) and aerial deliveries are known to be permitted.

Alternatively and/or in addition, certain constraints may include non-constant mapping functions. According to aspects of the present disclosure, a constraint relating to the type and percentage of vegetation cover of an area may be a function of the type and percentage of vegetation coverage. For example, a higher percentage of tree cover may make aerial delivery of items more difficult. Accordingly, the mapping function associated with a vegetation constraint may be a function of tree cover (e.g., higher location score for lower percentage of tree cover and lower location score for higher percentage of tree cover, etc.). However, certain vegetation (e.g., grass, etc.) may not affect the feasibility of performing aerial deliveries and may not be a factor in the mapping function associated with the vegetation constraint. Other constraints that may include respective mapping functions that are not constant functions may include, for example, a terrain classification constraint, a weather constraint, and the like. Accordingly, the mapping functions associated with such constraints may be a function of the corresponding particular constraint (e.g., terrain elevation, terrain roughness classification, precipitation, winds, visibility, etc.). Although certain constraints are described in connection with determining the suitability of an area for aerial delivery of items, other constraints may be utilized based on the contemplated service.

According to exemplary embodiments of the present disclosure, the constraints may be aggregated (e.g., a product, etc.) and applied (e.g., to the initial location score) for each cell of the area of interest to generate an overall location score for each cell of the area of interest. For example, the mapping function of each constraint may further scale and/or weight the initial location score for each cell to determine an overall location score for each cell. In an exemplary implementation, the initial population constraint may assign an initial location score of 0.5 to Cell 1, an airspace constraint may assign a unity function of 1 to Cell 1, and a vegetation/ground cover constraint may assign a value of 0.2 to Cell 1. Accordingly, this would result in an overall location score of 0.1 for Cell 1 (e.g., 0.5*1*0.2). In another exemplary implementation, the initial population constraint may assign an initial location score of 0.75 to Cell 2, an airspace constraint may assign a zero function of 0 to Cell 2, and a vegetation/ground cover constraint may assign a value of 0.4 to Cell 2. Accordingly, this would result in an overall location score of 0 for Cell 2 (e.g., 0.75*0*0.4). The overall location scores may then be returned in response to the request for location scores for the area of interest (e.g., environment 100). The overall location scores may be returned in the form of a data file, a map, and the like.

According to certain aspects of the present disclosure, information associated with each constraint may need to be converted to the resolution of the plurality of cells. In exemplary implementations, each constraint may be provided at different resolutions, which may not necessarily correspond to the size of the plurality of cells for which the location scores are being determined. For example, information obtained in connection with a first constraint may be provided at a resolution of 1 $km^2$ cells, while information obtained in connection with a second constraint may be provided at a resolution of 2 $km^2$ cells, and information obtained in connection with a third constraint may be provided at a resolution of 3 $km^2$. Accordingly, the information associated with the various constraints provided at different resolutions may be converted to correspond to the resolution of the plurality of cells. For example, the information may be rasterized to convert the resolution of the information to the desired resolution prior to aggregation of the various constraints.

Figure 2:
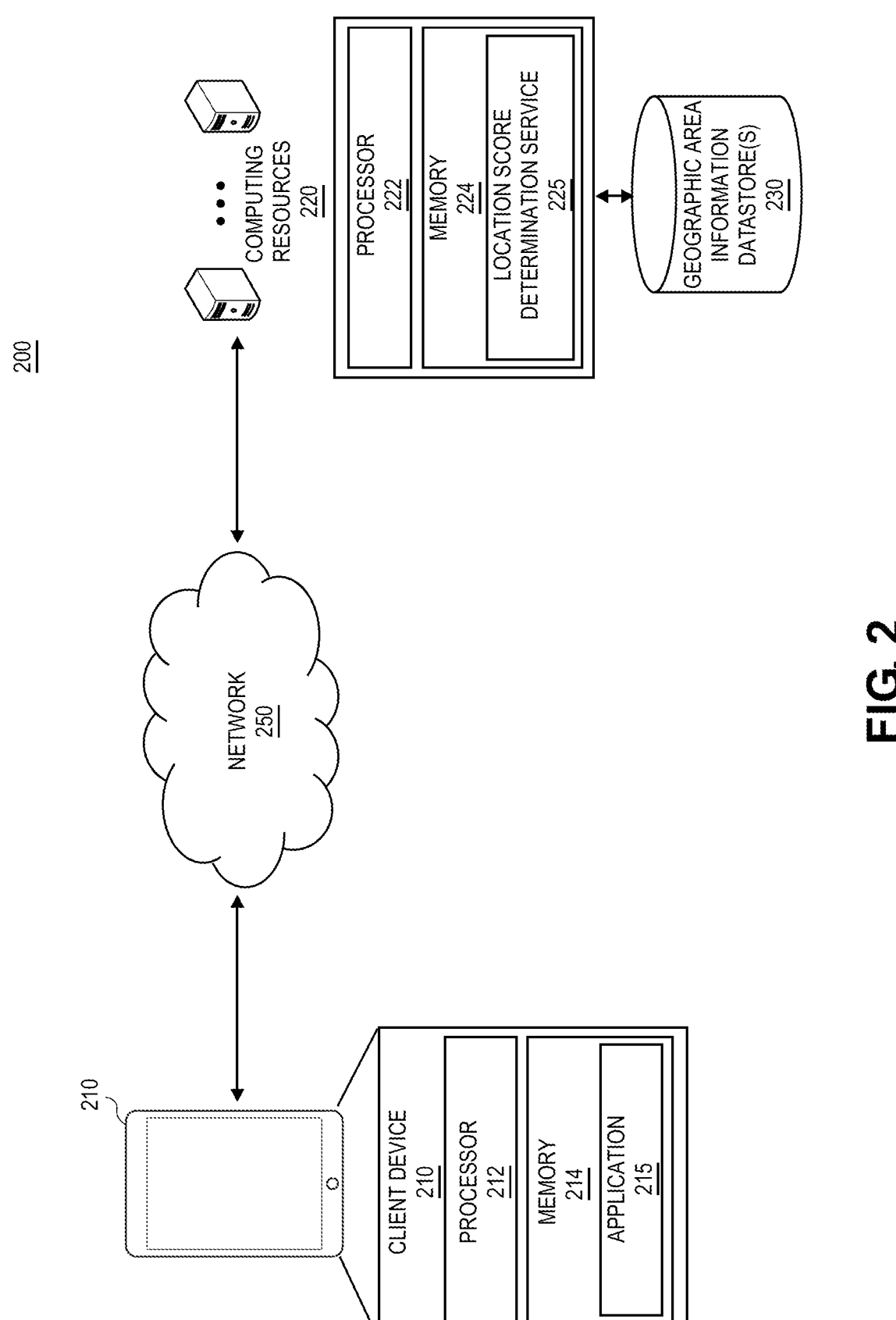
FIG. 2 is an illustration of an exemplary computing environment, according to exemplary embodiments of the present disclosure.

FIG. 2 is an illustration of an exemplary computing environment 200, according to exemplary embodiments of the present disclosure.

As shown in FIG. 2, computing environment 200 may include one or more client devices 210, also referred to as user devices, for connecting over network 250 to access computing resources 220. Client device 210 may include any type of computing device, such as a smartphone, tablet, laptop computer, desktop computer, wearable, etc., and network 250 may include any wired or wireless network (e.g., the Internet, cellular, satellite, Bluetooth, Wi-Fi, etc.) that can facilitate communications between client device 210 and computing resources 220. Computing resources 220 may include one or more processors 222 and one or more memory 224, which may store one or more applications, such as location score determination service 225, that may be executed by processor(s) 222 to cause the processor(s) 222 of computing resources 220 to perform various functions and/or actions. According to aspects of the present disclosure, computing resources 220 may represent at least a portion of a networked computing system that may be configured to provide online applications, services, computing platforms, servers, and the like, that may be configured to execute on a networked computing system. Further, computing resources 220 may communicate with one or more datastore(s), such as geographic area information datastores 230, which may be configured to store and maintain a corpus of geographic area information (e.g., population information, airspace information, terrain information, weather information, infrastructure information, etc.) which may be provided to and utilized by location score determination service 225 in connection with determining and applying one or more constraints in the determination of location scores for an area of interest, which may be provided to client device 210 in response to a request for location scores for the area of interest.

According to exemplary implementations of the present disclosure, computing resources 220 may be representative of computing resources that may form a portion of a larger networked computing platform (e.g., a cloud computing platform, and the like), which may be accessed by client device 210. Computing resources 220 may provide various services and/or resources and do not require end-user knowledge of the physical premises and configuration of the system that delivers the services. For example, computing resources 220 may include "on-demand computing platforms," "software as a service (SaaS)," "infrastructure as a service (IaaS)," "platform as a service (PaaS)," "platform computing," "network-accessible platforms," "data centers," "virtual computing platforms," and so forth. Example components of a remote computing resource, which may be used to implement computing resources 220, are discussed below with respect to FIG. 6.

As illustrated in FIG. 2 client device 210 may access and/or interact with location score determination service 225 through network 250 via one or more applications 215 operating and/or executing on client device 210. For example, a user associated with client device 210 may launch and/or execute such an application on client device 210 to access and/or interact with applications and/or services executing on computing resources 220 via network 250. According to aspects of the present disclosure, a user may, via execution of application 215 on client device 210, access or log into services executing on computing resources 220 by submitting one or more credentials (e.g., username/password, biometrics, secure token, etc.) through a user interface presented on client device 210.

Once logged into services executing on remote computing resources 220, a user associated with client device 210 may request the generation of location scores for an area of interest via client device 210. For example, a request for the generation of location scores for an area of interest may include identification of an area of interest (e.g., postal codes, a city/town, a county, a state, a country, a continent, coordinates, selecting from predetermined areas of interest, etc.), as well as certain user-specified parameters, such as specifying an output type, specifying certain constraints to be included and/or excluded, parameters associated with the service to be provided, and the like. This can facilitate, for example, efficient comparisons between multiple areas of interest in assessing the suitability of the various areas of interest while applying the same input parameters to the various areas of interest. Further, the input parameters may be used as a feedback loop, which may be used to determine constraints, mapping functions, and/or other considerations that may be used in determining the suitability of areas of interest in connection with a particular service.

In connection with a request for location scores, location score determination service 225 may obtain various geographic information associated with the geographic area of interest specified by the user from geographic area information datastores 230. The geographic information obtained from geographic area information datastores 230 may be processed to determine and apply constraints to the geographic area of interest specified by the user in determining location scores for the geographic area of interest specified by the user.

According to exemplary embodiments of the present disclosure, a user may submit, via client device 210, a request for location scores for an area of interest in connection with a contemplated service to location score determination service 225. The area of interest may include, for example, a geographic area specified by postal codes, town/city/county/state boundaries, countries, continents, coordinates, and the like. The request for location scores for the area of interest may also include certain user-specified parameters, such as specifying an output type, specifying certain constraints to be included and/or excluded, parameters associated with the service to be provided, and the like.

In an exemplary implementation, the request for location scores for the area of interest identified by the user may be in connection with assessing the suitability of performing aerial delivery of items within the area of interest. This can facilitate, for example, efficient comparisons between multiple areas of interest in assessing the suitability of the various areas of interest while applying the same input parameters to the various areas of interest. Further, the input parameters may be used as a feedback loop, which may be used to determine constraints, mapping functions, and/or other considerations that may be used in determining the suitability of areas of interest in connection with a particular service. For example, the location scores determined by location score determination service 225 may include a value between zero and one that represents a likelihood that a person within a particular area is able to receive an item via aerial delivery.

After the area of interest has been received from the user via client device 210, the area of interest may be divided into a plurality of cells. The shape and size of each cell may be based on parameters associated with the service (i.e., aerial delivery of items in this instance) for which the location scores are being generated. Alternatively and/or in addition, the cells and/or area of interest may be defined by terrain characteristics (e.g., mountains, elevational changes, level terrain, forested areas, roadways, etc.), and/or geographical parameters (e.g., zip codes, town boundaries, state boundaries, etc.). In the exemplary implementation where location scores are being determined in connection with determining the suitability of performing aerial delivery of items to the area of interest, each cell may include a rectangular area of $1.0 \text{ km}^2$. Embodiments of the present disclosure also contemplate cells of other shapes (e.g., circular, triangular, rhombus, pentagons, hexagons, etc.) and sizes (e.g., $0.25 \text{ km}^2$, $0.5 \text{ km}^2$, $0.75 \text{ km}^2$, $1.5 \text{ km}^2$, etc.). After dividing the area of interest into a plurality of cells, one or more constraints, as defined by their respective mapping functions, may be applied and aggregated in connection with the area of interest to determine location scores for each cell.

According to certain aspects of the present disclosure, information associated with each constraint may need to be converted to the resolution of the plurality of cells. In exemplary implementations, each constraint may be provided at different resolutions, which may not necessarily correspond to the size of the plurality of cells for which the location scores are being determined. For example, information obtained in connection with a first constraint may be provided at a resolution of $1 \text{ km}^2$ cells, while information obtained in connection with a second constraint may be provided at a resolution of $2 \text{ km}^2$ cells, and information obtained in connection with a third constraint may be provided at a resolution of $3 \text{ km}^2$. Accordingly, the information associated with the various constraints provided at different resolutions may be converted to correspond to the resolution of the plurality of cells. For example, the information may be rasterized to convert the resolution of the information to the desired resolution prior to application and/or aggregation of the various constraints.

According to aspects of the present disclosure, the applied constraints may include an initial constraint based on the population of each cell of the area of interest. Alternatively and/or in addition, any constraint may serve as the initial constraint in determining location scores for each cell of the area of interest. With respect to the population constraint, population information may be obtained from geographic area information datastores 230, and the population density of each cell may be computed and a mapping function that maps the population density to a location score may be applied. According to an exemplary implementation of the present disclosure, a piecewise linear mapping function that defines various breakpoints as tuples of population density and location score may be determined and applied. In the exemplary implementation, the piecewise linear mapping function may be determined based on parameters and considerations associated performing aerial delivery of items. Accordingly, in connection with determining location scores for assessing the suitability of performing aerial delivery of items, the capabilities of the aerial vehicle (e.g., maximum altitude, required landing radius, etc.), the logistics of performing an aerial delivery (e.g., locations, clearances, etc.), the safety of performing an aerial delivery, and the like may be considered in determining the mapping function. In view of these parameters and considerations, it may be assumed that aerial delivery of items may become increasingly difficult as the population density of an area increases.

Accordingly, the piecewise linear mapping function that maps the population density to a location score may define a corresponding location score for various population density thresholds based on the various parameters associated with the contemplated service. In one exemplary implementation, the piecewise linear mapping function may assign a location score of 1.0 (e.g., 100% likelihood that aerial delivery is possible) to a population density of 0 (e.g., no population density may indicate a rural area where aerial delivery may be easily performed), a location score of 0 (e.g., 0% likelihood of aerial delivery) may be assigned to a population density above a certain threshold (e.g., above 10,000 people/m², 12,000 people/m², 15,000 people/m², etc.—a high population density may indicate difficulty in safely performing aerial delivery in view of infrastructure, number of people, availability of potential delivery locations, etc.), and various other location scores (e.g., 0.95, 0.90, 0.85, 0.80, 0.75, 0.50, 0.25, etc.) may be assigned to various other corresponding thresholds of population density (e.g., 1,000 people/m², 1,500 people/m², 2,000 people/m², 2,500 people/m², etc.). Aspects of the present disclosure contemplate any number of location score breakpoints at any number of population density thresholds. The location scores determined based on the initial population density constraint may be considered to be an initial and/or baseline location score.

In addition to the initial constraint based on population density, additional constraints may also be utilized. For example, certain geographic information may be obtained from geographic area information datastores 230 to facilitate application of each additional constraint, so that a location score may be determined for each cell of an area of interest that is an aggregation of all the various constraints. In the exemplary implementation, the additional constraints, along with their respective associated mapping functions, may also be determined based on parameters and considerations associated with aerial delivery of items. According to aspects of the present disclosure, the additional constraints may include and/or be based on information such as vegetation and/or ground cover information (e.g., type of vegetational ground cover and ground cover percentage, etc.), terrain classifications (e.g., difference between minimum and maximum elevations of the area, etc.), weather information (e.g., precipitation, temperature, wind, visibility, etc.), airspace classification information (e.g., restricted airspace, prohibited airspace, etc.), infrastructure classification information (e.g., national parks, prisons, schools, universities, houses of worship, sporting venues, manufacturing facilities, hospitals, electrical grid infrastructure, water infrastructure, etc.).

Further, each additional constraint may also include a respective mapping function. According to aspects of the present disclosure, each respective mapping function may include a corresponding piecewise linear function, a linear function, a constant function, and the like. For example, the constant functions may include a zero function in connection with a prohibited airspace constraint for areas that correspond to prohibited airspace (e.g., over military bases, over the White House, over nuclear power plants, etc.) and a unity constant function in connection with known permitted areas for areas that correspond to areas where aerial delivery arrangements have been made (e.g., universities, multi-unit residential properties, commercial properties, etc.) and aerial deliveries are known to be permitted.

Alternatively and/or in addition, certain constraints may include a non-constant mapping function. According to aspects of the present disclosure, a constraint relating to the type and percentage of vegetation cover of an area may be a function of the type and percentage of vegetation coverage. For example, a higher percentage of tree cover may make aerial delivery of items more difficult. Accordingly, the mapping function associated with a vegetation constraint may be a function of tree cover (e.g., higher location score for lower percentage of tree cover and lower location score for higher percentage of tree cover, etc.). However, certain vegetation (e.g., grass, etc.) may not affect the feasibility of performing aerial deliveries and may not be a factor in the mapping function associated with the vegetation constraint. Other constraints that may include respective mapping functions that are not constant functions may include, for example, a terrain classification constraint, a weather constraint, and the like. Accordingly, the mapping functions associated with such constraints may be a function of the corresponding particular constraint (e.g., terrain elevation, terrain roughness classification, precipitation, winds, visibility, etc.). Although certain constraints are described in connection with determining the suitability of an area for aerial delivery of items, other constraints may be utilized based on the contemplated service.

According to exemplary embodiments of the present disclosure, the constraints may be aggregated (e.g., a product, etc.) for each cell of the area of interest to generate an overall location score for each cell of the area of interest. For example, the mapping function of each constraint may further scale and/or weight the initial location score for each cell to determine an overall location score for each cell. In an exemplary implementation, the initial population constraint may assign an initial location score of 0.5 to Cell 1, an airspace constraint may assign a unity function of 1 to Cell 1, and a vegetation/ground cover constraint may assign a value of 0.2 to Cell 1. Accordingly, this would result in an overall location score of 0.1 for Cell 1 (e.g., 0.5*1*0.2). In another exemplary implementation, the initial population constraint may assign an initial location score of 0.75 to Cell 2, an airspace constraint may assign a zero function of 0 to Cell 2, and a vegetation/ground cover constraint may assign a value of 0.4 to Cell 2. Accordingly, this would result in an overall location score of 0 for Cell 2 (e.g., 0.75*0*0.4). The overall location scores may then be returned to client device 210 in response to the request for location scores for the area of interest. According to exemplary embodiments of the present disclosure, the location scores may be returned to client device 210 in the form of a data file, a map of the area of interest that graphically represents the location scores of each cell, and the like.

Figure 3:
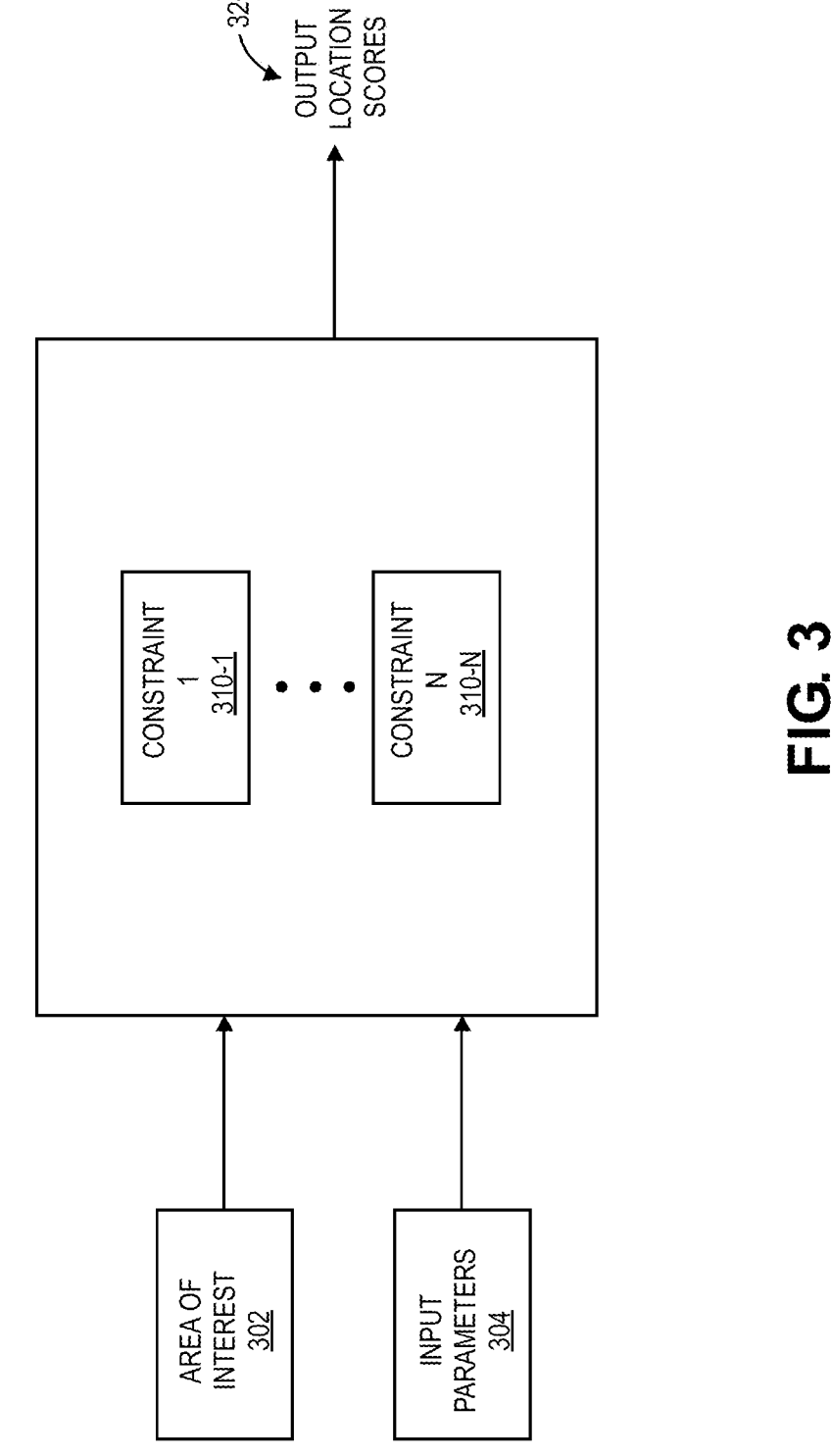
FIG. 3 is a block diagram illustrating an exemplary location score determination system, according to exemplary embodiments of the present disclosure.

FIG. 3 is a block diagram illustrating an exemplary location score determination system 300, according to exemplary embodiments of the present disclosure. The exemplary location score determination system 300 illustrated in FIG. 3 may, for example, be implemented as location score determination service 225.

As shown in FIG. 3, location score determination system 300 may generate output location scores 320 based on an area of interest 302 and input parameters 304. According to exemplary embodiments of the present disclosure, area of interest 302 and input parameters 304 may be provided in connection with a request for location scores for area of interest 302 in connection with a contemplated service for area of interest 302. Area of interest 302 may include, for example, a geographic area specified by postal codes, town/city/county/state boundaries, countries, regions, continents, coordinates, and the like. Further, input parameters 304 may include certain user-specified parameters, such as specifying an output type, specifying certain constraints to be included and/or excluded, parameters associated with the service to be provided, and the like.

Based on area of interest 302 and input parameters 304, location score determination system 300 may be configured to generate output location scores 320 for area of interest 302. In the exemplary implementation where location scores are being generated in connection with an assessment for performing aerial deliveries of items, output location scores 302 may include a value between zero and one that represents a likelihood that a person within a particular area is able to receive an item via aerial delivery. Further, output location scores 320 may be provided in the form of a data file, a map of area of interest 302 that graphically represents the location scores for area of interest 302, and the like.

As illustrated, location score determination system 300 may determine output location scores 320 for area of interest 302 based on constraints 310 (e.g., constraint 1 310-1 through constraint N 310-N). Each constraint 310 may include an associated mapping function that may be applied and aggregated to determine the location scores for area of interest 302. After the area of interest has been received and divided into a plurality of cells, location score determination system 300 may apply constraints 310, along with their corresponding mapping functions, so as to aggregate all constraints 310 for each cell in determination of output location scores 320. The number and type of constraints applied may be based on parameters and considerations associated with the type of service being contemplated in connection with area of interest 302. For example, in connection with contemplation of aerial delivery of items, constraints 310 may include population information, airspace information, weather information, infrastructure information, terrain information, vegetation information, and the like. By way of another example, in connection with contemplation of opening a coffee shop, constraints 310 may include population information, transit information, competing coffee shop information, and the like.

In an exemplary implementation where location score determination system 300 is determining output location scores 320 in connection with an assessment of the feasibility of performing aerial delivery of items, constraints 310 may include a constraint based on the population of each cell of area of interest 302, vegetation and/or ground cover information (e.g., type of vegetational ground cover and ground cover percentage, etc.) of each cell of area of interest 302, terrain classifications (e.g., difference between minimum and maximum elevations of the area, etc.), weather information (e.g., precipitation, temperature, wind, visibility, etc.) of each cell of area of interest 302, airspace classification information (e.g., restricted airspace, prohibited airspace, etc.) of each cell of area of interest 302, infrastructure classification information (e.g., national parks, prisons, schools, universities, houses of worship, sporting venues, manufacturing facilities, hospitals, electrical grid infrastructure, water infrastructure, etc.) of each cell of area of interest 302, and the like.

For each constraint 310, location score determination system 300 may apply a corresponding mapping function for each cell of area of interest 302. Accordingly, the aggregation of all constraints 310 for each cell of area of interest 302 may produce the location score for each cell of area of interest 302. The corresponding mapping function for each constraint 310 may include a corresponding piecewise linear function, a linear function, a constant function, and the like. According to certain aspects of the present disclosure, information associated with each constraint 310 may need to be converted to a resolution corresponding to the plurality of cells. In exemplary implementations, each constraint 310 may be provided at different resolutions, which may not necessarily correspond to the size of the plurality of cells for which the location scores are being determined. For example, information obtained in connection with a first constraint may be provided at a resolution of 1 km$^2$ cells, while information obtained in connection with a second constraint may be provided at a resolution of 2 km$^2$ cells, and information obtained in connection with a third constraint may be provided at a resolution of 3 km$^2$. Accordingly, the information associated with the various constraints provided at different resolutions may be converted to correspond to the resolution of the plurality of cells. For example, the information may be rasterized to convert the resolution of the information to the desired resolution prior to aggregation of the various constraints.

For example, a population information constraint may include a piecewise linear mapping function that defines various breakpoints as tuples of population density and location score may be determined and applied. In the exemplary implementation, the piecewise linear mapping function may be determined based on parameters and considerations associated performing aerial delivery of items. Accordingly, in connection with determining location scores for assessing the suitability of performing aerial delivery of items, the capabilities of the aerial vehicle (e.g., maximum altitude, required landing radius, etc.), the logistics of performing an aerial delivery (e.g., locations, clearances, etc.), the safety of performing an aerial delivery, and the like may be considered in determining the mapping function. In view of these parameters and considerations, it may be assumed that aerial delivery of items may become increasingly difficult as the population density of an area increases.

Accordingly, the piecewise linear mapping function that maps the population density to a location score may define a corresponding location score for various population density thresholds based on the various parameters associated with the contemplated service. In one exemplary implementation, the piecewise linear mapping function may assign a location score of 1.0 (e.g., 100% likelihood that aerial delivery is possible) to a population density of 0 (e.g., no population density may indicate a rural area where aerial delivery may be easily performed), a location score of 0 (e.g., 0% likelihood of aerial delivery) may be assigned to a population density above a certain threshold (e.g., above 10,000 people/m$^2$, 12,000 people/m$^2$, 15,000 people/m$^2$, etc.—a high population density may indicate difficulty in safely performing aerial delivery in view of infrastructure, number of people, availability of potential delivery locations, etc.), and various other location scores (e.g., 0.95, 0.90, 0.85, 0.80, 0.75, 0.50, 0.25, etc.) may be assigned to various other corresponding thresholds of population density (e.g., 1,000 people/m$^2$, 1,500 people/m$^2$, 2,000 people/ m$^2$, 2,500 people/m$^2$, etc.). Aspects of the present disclosure contemplate any number of location score breakpoints at any number of population density thresholds.

Other constraints may include other respective mapping functions. According to aspects of the present disclosure, each respective mapping function may include a corresponding piecewise linear function, a linear function, a constant function, and the like. For example, the constant functions may include a zero function in connection with a prohibited airspace constraint for areas that correspond to prohibited airspace (e.g., over military bases, over the White House, over nuclear power plants, etc.) and a unity constant function in connection with a known permitted area constraint for areas that correspond to areas where aerial delivery arrangements have been made (e.g., universities, multi-unit residential properties, commercial properties, etc.) and aerial deliveries are known to be permitted.

Alternatively and/or in addition, certain constraints may include non-constant mapping functions. According to aspects of the present disclosure, a constraint relating to the type and percentage of vegetation cover of an area may be a function of the type and percentage of vegetation coverage. For example, a higher percentage of tree cover may make aerial delivery of items more difficult. Accordingly, the mapping function associated with a vegetation constraint may be a function of tree cover (e.g., higher location score for lower percentage of tree cover and lower location score for higher percentage of tree cover, etc.). However, certain vegetation (e.g., grass, etc.) may not affect the feasibility of performing aerial deliveries and may not be a factor in the mapping function associated with the vegetation constraint. Other constraints that may include respective mapping functions that are not constant functions may include, for example, a terrain classification constraint, a weather constraint, and the like. Accordingly, the mapping functions associated with such constraints may be a function of the corresponding particular constraint (e.g., terrain elevation, terrain roughness classification, precipitation, winds, visibility, etc.). Although certain constraints are described in connection with determining the suitability of an area for aerial delivery of items, other constraints may be utilized based on the contemplated service.

According to exemplary embodiments of the present disclosure, the aggregation of all constraints 310 for each cell of area of interest 302 may produce the location score for each cell of area of interest 302, which may be compiled and returned as output location scores 320. For example, the mapping function of each constraint may further scale and/or weight the location score for each cell to determine an overall location score for each cell. In an exemplary implementation, the initial population constraint may assign an initial location score of 0.5 to Cell 1, an airspace constraint may assign a unity function of 1 to Cell 1, and a vegetation/ground cover constraint may assign a value of 0.2 to Cell 1. Accordingly, this would result in an overall location score of 0.1 for Cell 1 (e.g., 0.5*1*0.2). In another exemplary implementation, the initial population constraint may assign an initial location score of 0.75 to Cell 2, an airspace constraint may assign a zero function of 0 to Cell 2, and a vegetation/ground cover constraint may assign a value of 0.4 to Cell 2. Accordingly, this would result in an overall location score of 0 for Cell 2 (e.g., 0.75*0*0.4). Output location scores 320 may be provided in the form of a data file, a map of area of interest 302 that graphically represents the location scores for area of interest 302, and the like.

FIGS. 4A-4G are illustrations of an exemplary area of interest 400 in determining location scores for area of interest 400, according to exemplary embodiments of the present disclosure.

Figure 4A:
FIGS. 4A-4G are illustrations of an exemplary area of interest in determining location scores for the area of interest, according to exemplary embodiments of the present disclosure.

FIGS. 4A-4G illustrate area of interest 400, for which location scores may be determined, according to exemplary embodiments of the present disclosure. In FIG. 4A, area of interest 400 may have been provided by a user in connection with a request for determination of location scores for area of interest 400 in connection with provisioning of a service, such as performing aerial delivery of items. As illustrated in FIG. 4A, area of interest 400 may include roadways and a body of water (lower right). Area of interest 400 may have been specified via identification of postal codes, a city/town, a county, a state, a country, a continent, coordinates, a predetermined areas of interest, and the like.

Figure 4B:

After area of interest 400 has been received from the user, area of interest 400 may be divided into a plurality of cells 410, as shown in FIG. 4B. Although FIG. 4B illustrates cells 410 to be substantially square-shaped, the shape and size of each cell may be based on parameters associated with the contemplated service (i.e., aerial delivery of items in this instance) for which the location scores are being generated. Alternatively and/or in addition, cells 410 may be defined by terrain characteristics (e.g., mountains, elevational changes, level terrain, forested areas, roadways, etc.), and/or geographical parameters (e.g., zip codes, town boundaries, state boundaries, etc.). In the exemplary implementation where location scores are being determined in connection with determining the suitability of performing aerial delivery of items to area of interest 400, each cell 410 may include a rectangular area of 1.0 km$^2$. Embodiments of the present disclosure also contemplate cells of other shapes (e.g., circular, triangular, rhombus, pentagons, hexagons, etc.) and sizes (e.g., 0.25 km$^2$, 0.5 km$^2$, 0.75 km$^2$, 1.5 km$^2$, etc.). After dividing the area of interest into a plurality of cells 410, one or more constraints, as defined by their respective mapping functions, may be applied and aggregated in connection with area of interest 400 to determine location scores for each cell 410.

Figure 4C:
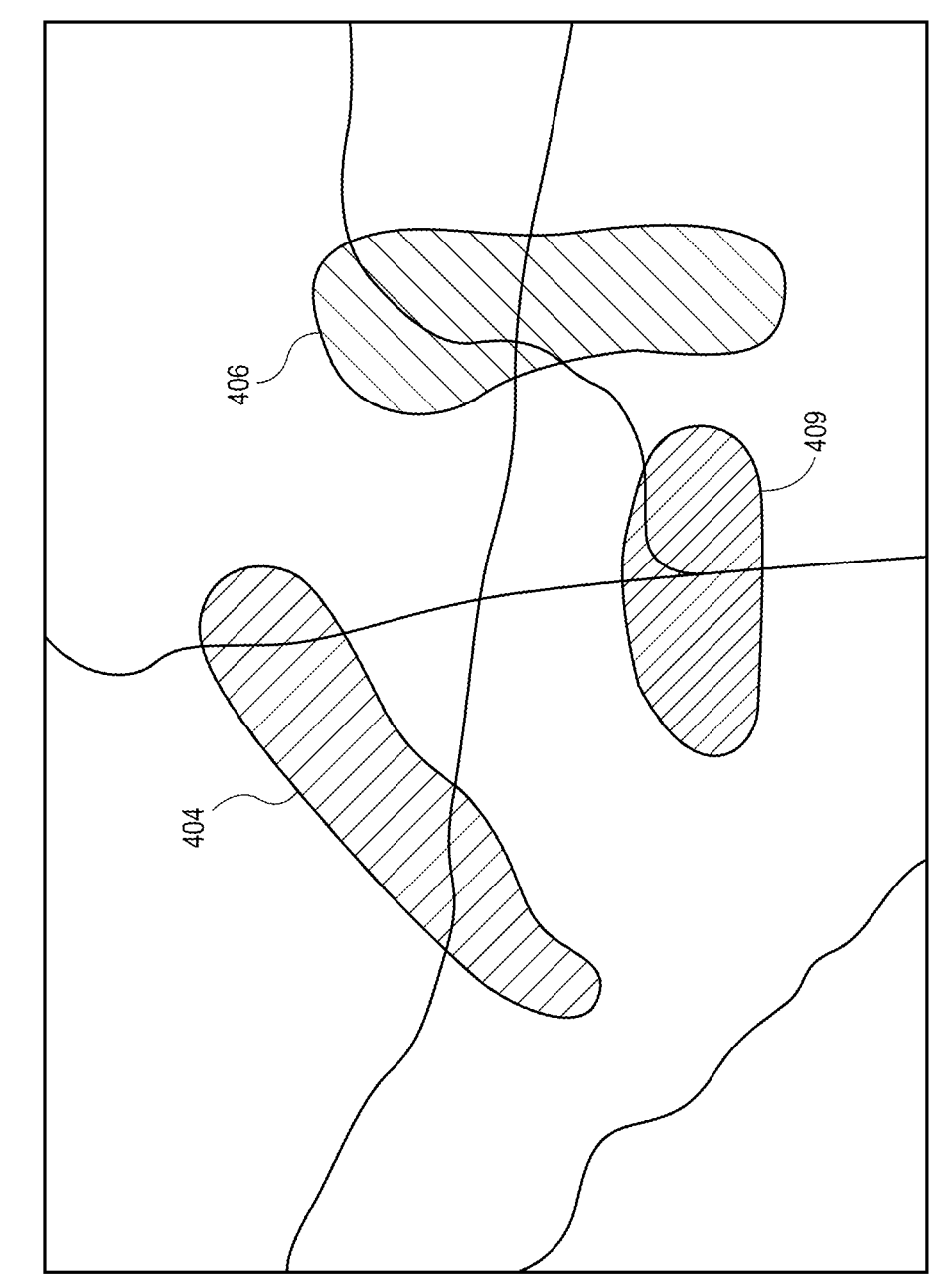

FIG. 4C is an exemplary illustration of a graphical representation of a constraint applied to area of interest 400, according to exemplary embodiments of the present disclosure. For example, FIG. 4C may be a graphical representation of a population information constraint. Accordingly, shaded area 404 may be associated with a first location score value in view of a population density of cells 410 within shaded area 404. Similarly, shaded area 406 may be associated with a second location score value in view of a population density of cells 410 within shaded area 406, and shaded area 409 may be associated with a third location score value in view of a population density of cells 410 within shaded area 409.

According to exemplary embodiments of the present disclosure, each location score associated with shaded areas 404, 406, and 409 may be determined based on the population of cells 410 within shaded areas 404, 406, and 409 in view of a mapping function. In an exemplary implementation, the mapping function may include a piecewise linear mapping function that defines various breakpoints as tuples of population density and location score may be determined and applied. Accordingly, each of shaded areas 404, 406, and 409 may be assigned a corresponding location score as specified by the piecewise linear mapping function associated with the constraint (e.g., population constraint) being applied.

Figure 4D:
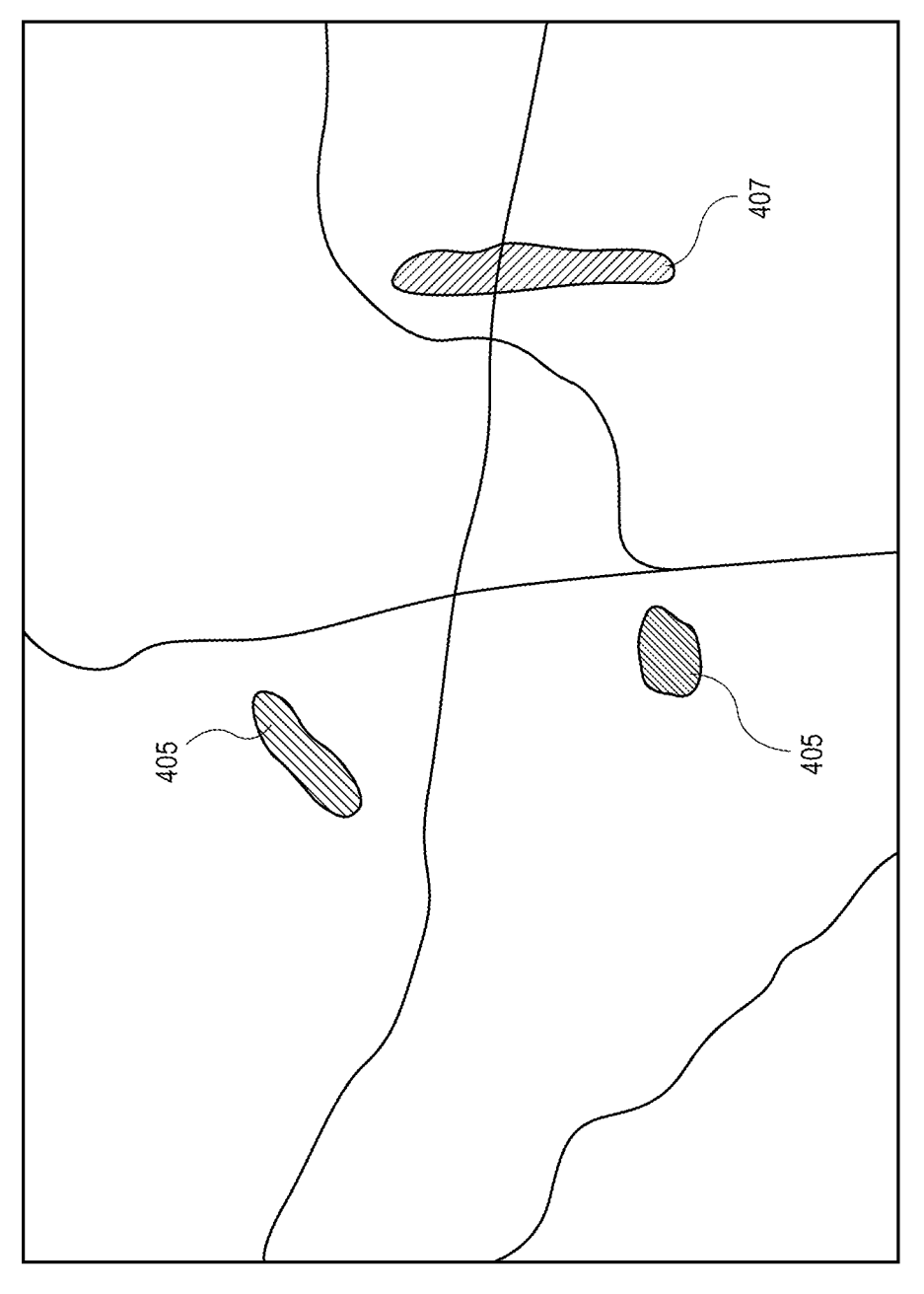

Similarly, FIG. 4D is an exemplary illustration of a graphical representation of another constraint applied to area of interest 400, according to exemplary embodiments of the present disclosure. For example, FIG. 4D may be a graphical representation of a vegetation information constraint. Accordingly, shaded areas 405 may be associated with a first location score value in view of a vegetation cover percentage of cells 410 within shaded areas 405, and shaded area 407 may be associated with a second location score value in view of a vegetation cover percentage of cells 410 within shaded area 407.

According to exemplary embodiments of the present disclosure, each location score associated with shaded areas 405 and 407 may be determined based on the vegetation cover percentage of cells 410 within shaded areas 405 and 407 in view of a mapping function. In an exemplary implementation, the mapping function may include a piecewise linear mapping function that defines various breakpoints as tuples of vegetation cover and location score, a linear relationship between vegetation cover and location score, a constant relationship between vegetation cover and location score, an exponential relationship between vegetation cover and location score, a and the like, and the location score may be determined and applied based on the vegetation cover in each cell 410 of shaded areas 405 and 407. Accordingly, each of shaded areas 405 and 407 may be assigned a corresponding location score as specified by the mapping function associated with the constraint (e.g., vegetation cover constraint) being applied.

Figure 4E:
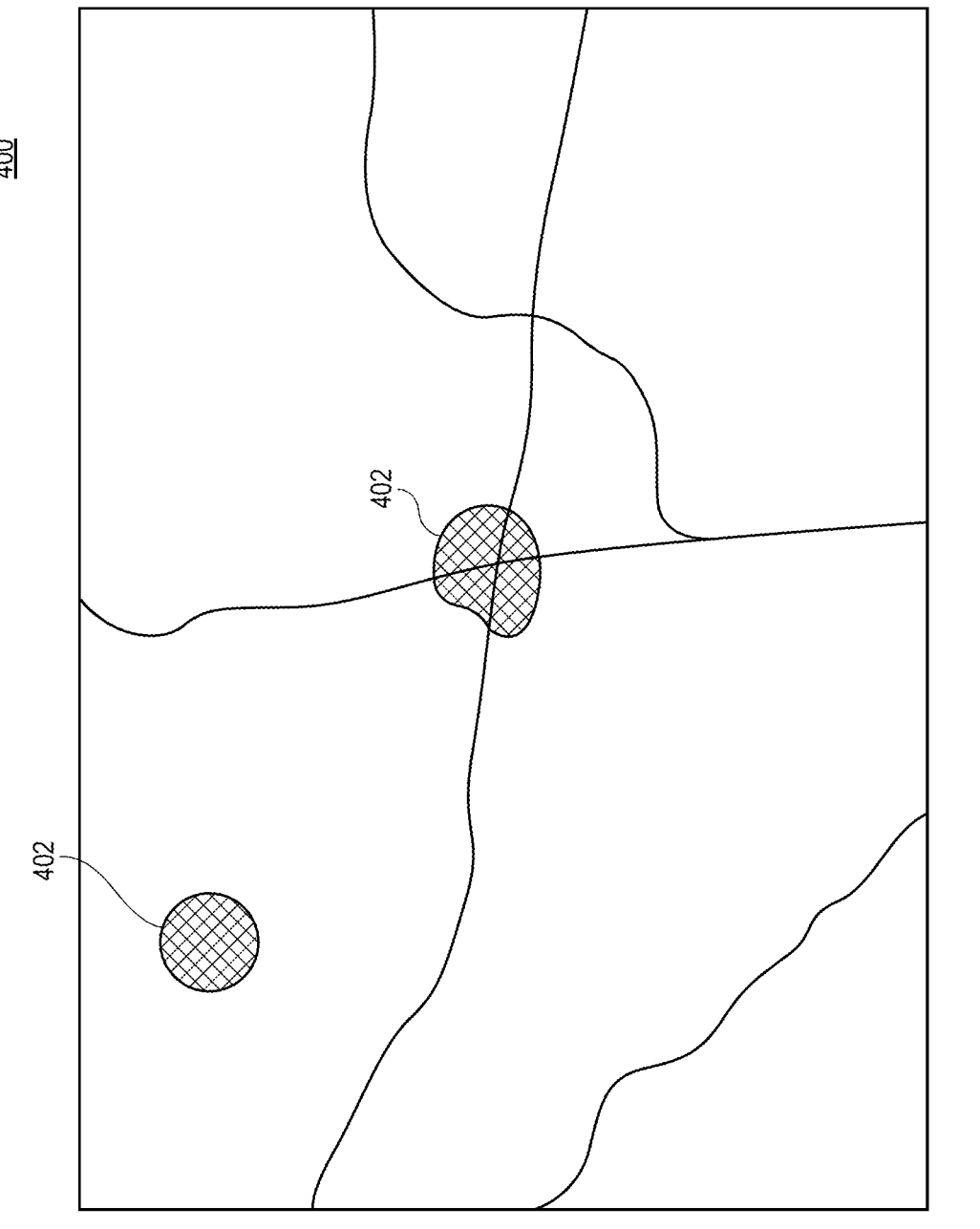

FIG. 4E is an exemplary illustration of a graphical representation of another constraint applied to area of interest 400, according to exemplary embodiments of the present disclosure. For example, FIG. 4E may be a graphical representation of a prohibited airspace constraint. Accordingly, shaded areas 402 may correspond to areas where the airspace is effectively closed (e.g., over military bases, over the White House, over nuclear power plants, etc.). Accordingly, the mapping function associated with the prohibited airspace constraint may include a constant zero function, and the location scores for shaded areas 402 may be zero, indicating that aerial delivery of items is unavailable in shaded areas 402.

Figure 4F:
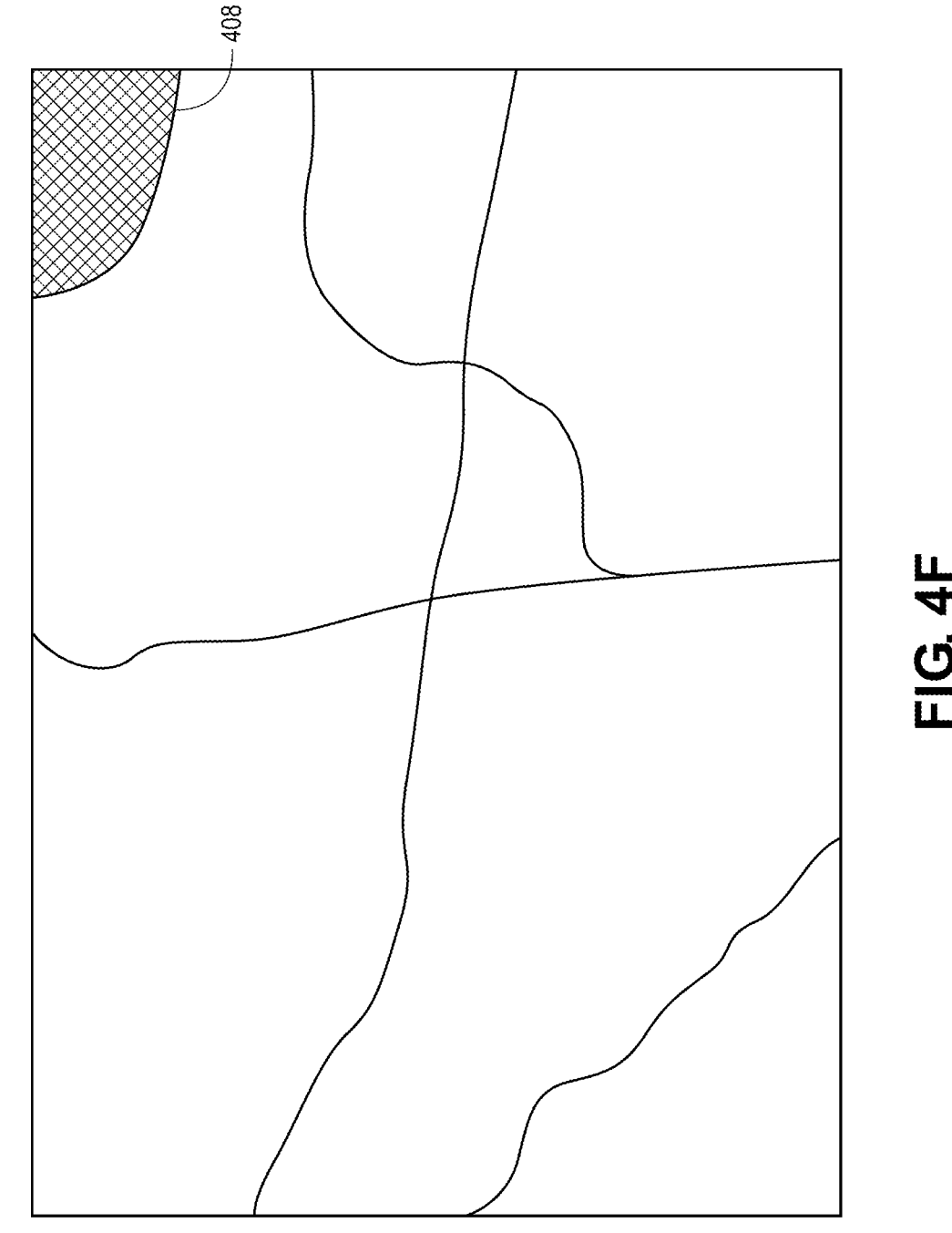

Conversely, FIG. 4F is an exemplary illustration of a graphical representation of another constraint applied to area of interest 400, according to exemplary embodiments of the present disclosure. For example, FIG. 4F may be a graphical representation of an infrastructure constraint for known aerial delivery locations. Accordingly, shaded area 408 may correspond to an area where aerial delivery arrangements have been made (e.g., universities, multi-unit residential properties, commercial properties, etc.) and aerial deliveries are known to be permitted. Accordingly, the mapping function associated with the prohibited airspace constraint may include a constant unity function, and the location scores for shaded area 408 may be one, indicating that aerial delivery of items is available in shaded area 408.

Figure 4G:
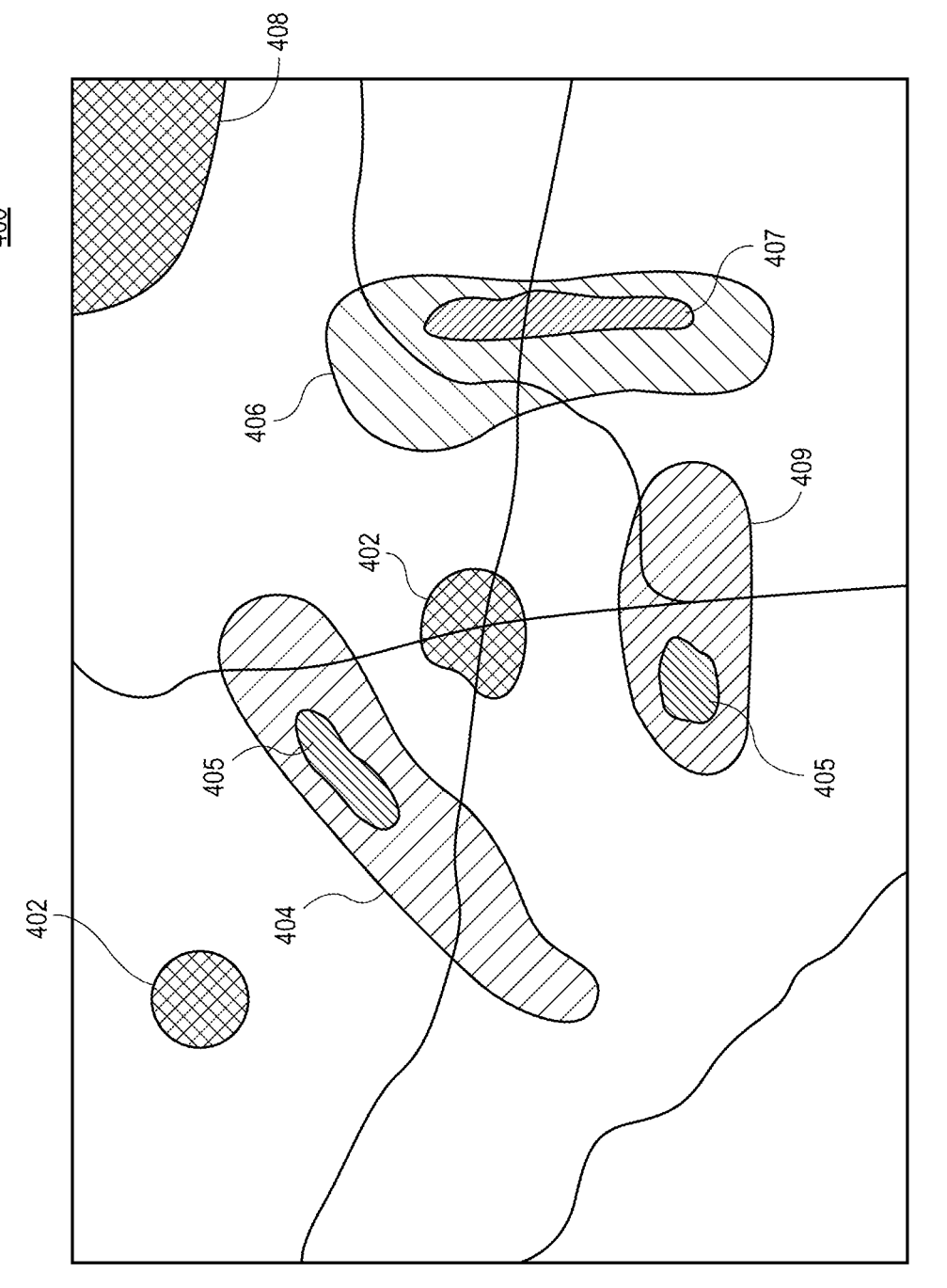

FIG. 4G is an exemplary illustration of a graphical representation of an aggregation of the constraints shown in FIGS. 4C-4F that were applied to area of interest 400, according to exemplary embodiments of the present disclosure. According to certain aspects of the present disclosure, information associated with each constraint may have been converted to the resolution of the plurality of cells prior to aggregation of the constraints, as shown in FIG. 4G. For example, FIG. 4C may illustrate an aggregation (e.g., a product, etc.) of the various constraints illustrated in FIGS. 4C-4F for each cell 410 of area of interest 400. Accordingly, FIG. 4G may represent a location score map for area of interest 400 that may be generated and provided to the user in response to the request for location scores for area of interest 400, where each shaded area 402, 404, 405, 406, 407, 408, and 409 represent different location scores. Alternatively and/or in addition, the location scores for each shaded area 402, 404, 405, 406, 407, 408, and 409 may be used to determine an expected percentage of the population within each shaded area 402, 404, 405, 406, 407, 408, and 409 that may be reachable via aerial delivery of items. Accordingly, the location scores may be utilized to generate other metrics to represent the feasibility and/or suitability of the service being contemplated.

Figure 5:
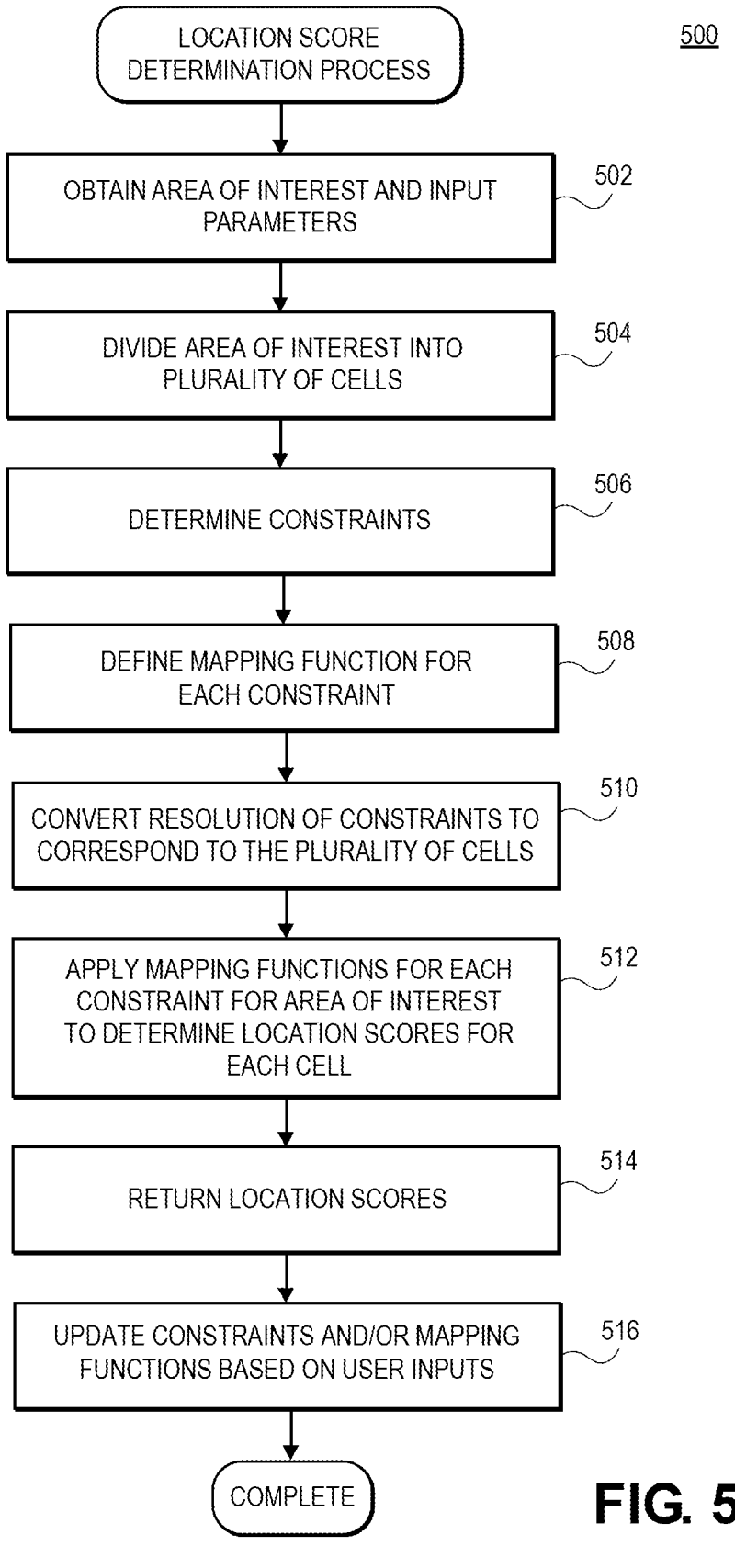
FIG. 5 is a flow diagram of an exemplary location score determination process, according to exemplary embodiments of the present disclosure.

FIG. 5 is a flow diagram of an exemplary location score determination process 500, according to exemplary embodiments of the present disclosure. Process 500 may be implemented, for example, to determine location scores for an area of interest in connection with assessing the feasibility and/or viability of a service, such as performing an aerial delivery of an item.

As shown in FIG. 5, exemplary location score determination process 500 may begin with the obtaining of an area of interest and, optionally, any input parameters, as in step 502. For example, the area of interest may be received in connection with a request for the generation of location scores for the area of interest and may be specified via postal codes, a city/town, a county, a state, a country, a continent, coordinates, selecting from predetermined areas of interest, and the like. Further, the input parameters may include certain user-specified parameters, such as specifying an output type, specifying certain constraints to be included and/or excluded, parameters associated with the service to be provided, and the like.

After the area of interest has been received, the area of interest may be divided into a plurality of cells, as in step 504. The shape and size of each cell may be based on parameters associated with the contemplated service (i.e., aerial delivery of items in this instance) for which location scores are being generated. Alternatively and/or in addition, the cells may be defined by terrain characteristics (e.g., mountains, elevational changes, level terrain, forested areas, roadways, etc.), and/or geographical parameters (e.g., postal codes, town boundaries, state boundaries, etc.). In the exemplary implementation where location scores are being determined in connection with determining the suitability of performing aerial delivery of items to the area of interest, each cell may include a rectangular area of 1.0 km$^2$. Embodiments of the present disclosure also contemplate cells of other shapes (e.g., circular, triangular, rhombus, pentagons, hexagons, etc.) and sizes (e.g., 0.25 km$^2$, 0.5 km$^2$, 0.75 km$^2$, 1.5 km$^2$, etc.).

In step 506, constraints to be applied to the area of interest are determined. According to exemplary embodiments of the present disclosure, the constraints and/or mapping functions may be determined based on the contemplated service. For example, in an exemplary implementation where the location scores are being determined in connection with an assessment of the feasibility of performing aerial delivery of items, the determined constraints may include a constraint based on the population of each cell in the area of interest, vegetation and/or ground cover information (e.g., type of vegetational ground cover and ground cover percentage, etc.) of each cell in the area of interest, terrain classifications (e.g., difference between minimum and maximum elevations of the area, etc.), weather information (e.g., precipitation, temperature, wind, visibility, etc.) of each cell in the area of interest, airspace classification information (e.g., restricted airspace, prohibited airspace, etc.) of each cell in the area of interest, infrastructure classification information (e.g., national parks, prisons, schools, universities, houses of worship, sporting venues, manufacturing facilities, hospitals, electrical grid infrastructure, water infrastructure, etc.) of each cell in the area of interest, and the like.

For each constraint, a corresponding mapping function may be determined, as in step 508. For example, a population information constraint may include a piecewise linear mapping function that defines various breakpoints as tuples of population density and location score may be determined and applied. In the exemplary implementation, the piecewise linear mapping function may be determined based on parameters and considerations associated performing aerial delivery of items. Accordingly, in connection with determining location scores for assessing the suitability of performing aerial delivery of items, the capabilities of the aerial vehicle (e.g., maximum altitude, required landing radius, etc.), the logistics of performing an aerial delivery (e.g., locations, clearances, etc.), the safety of performing an aerial delivery, and the like may be considered in determining the mapping function. In view of these parameters and considerations, it may be assumed that aerial delivery of items may become increasingly difficult as the population density of an area increases.

Accordingly, the piecewise linear mapping function that maps the population density to a location score may define a corresponding location score for various population density thresholds based on the various parameters associated with the contemplated service. In one exemplary implementation, the piecewise linear mapping function may assign a location score of 1.0 (e.g., 100% likelihood that aerial delivery is possible) to a population density of 0 (e.g., no population density may indicate a rural area where aerial delivery may be easily performed), a location score of 0 (e.g., 0% likelihood of aerial delivery) may be assigned to a population density above a certain threshold (e.g., above 10,000 people/m$^2$, 12,000 people/m$^2$, 15,000 people/m$^2$, etc.—a high population density may indicate difficulty in safely performing aerial delivery in view of infrastructure, number of people, availability of potential delivery locations, etc.), and various other location scores (e.g., 0.95, 0.90, 0.85, 0.80, 0.75, 0.50, 0.25, etc.) may be assigned to various other corresponding thresholds of population density (e.g., 1,000 people/m$^2$, 1,500 people/m$^2$, 2,000 people/m$^2$, 2,500 people/m$^2$, etc.). Aspects of the present disclosure contemplate any number of location score breakpoints at any number of population density thresholds.

Other constraints may include other respective mapping functions. According to aspects of the present disclosure, each respective mapping function may include a corresponding piecewise linear function, a linear function, a constant function, and the like. For example, the constant functions may include a zero function for areas that correspond to prohibited airspace (e.g., over military bases, over the White House, over nuclear power plants, etc.) and a unity constant function for areas that correspond to areas where aerial delivery arrangements have been made (e.g., universities, multi-unit residential properties, commercial properties, etc.) and aerial deliveries are known to be permitted.

Alternatively and/or in addition, certain constraints may include non-constant mapping functions. According to aspects of the present disclosure, a constraint relating to the type and percentage of vegetation cover of an area may be a function of the type and percentage of vegetation coverage. For example, a higher percentage of tree cover may make aerial delivery of items more difficult. Accordingly, the mapping function associated with a vegetation constraint may be a function of tree cover (e.g., higher location score for lower percentage of tree cover and lower location score for higher percentage of tree cover, etc.). However, certain vegetation (e.g., grass, etc.) may not affect the feasibility of performing aerial deliveries and may not be a factor in the mapping function associated with the vegetation constraint. Other constraints that may include respective mapping functions that are not constant functions may include, for example, a terrain classification constraint, a weather constraint, and the like. Accordingly, the mapping functions associated with such constraints may be a function of the corresponding particular constraint (e.g., terrain elevation, terrain roughness classification, precipitation, winds, visibility, etc.). Although certain constraints are described in connection with determining the suitability of an area for aerial delivery of items, other constraints may be utilized based on the contemplated service.

Optionally, in step 510, information associated with each constraint may need to be converted to the resolution that corresponds to the plurality of cells. In exemplary implementations, each constraint may be provided at different resolutions, which may not necessarily correspond to the size of the plurality of cells for which the location scores are being determined. For example, information obtained in connection with a first constraint may be provided at a resolution of 1 km$^2$ cells, while information obtained in connection with a second constraint may be provided at a resolution of 2 km$^2$ cells, and information obtained in connection with a third constraint may be provided at a resolution of 3 km$^2$. Accordingly, the information associated with the various constraints provided at different resolutions may be converted to correspond to the resolution of the plurality of cells. For example, the information may be rasterized to convert the resolution of the information to the desired resolution prior to aggregation of the various constraints.

In step 512, the mapping functions of the constraints may be applied for the area of interest to determine location scores for each cell of the area of interest. For example, the constraints may be aggregated (e.g., a product, etc.) for each cell of the area of interest to generate a location score for each cell of the area of interest, and in step 514, the location scores may be returned. For example, the mapping function of each constraint may further scale and/or weight the location score for each cell to determine an overall location score for each cell. In an exemplary implementation, the initial population constraint may assign an initial location score of 0.5 to Cell 1, an airspace constraint may assign a unity function of 1 to Cell 1, and a vegetation/ground cover constraint may assign a value of 0.2 to Cell 1. Accordingly, this would result in an overall location score of 0.1 for Cell 1 (e.g., 0.5*1*0.2). In another exemplary implementation, the initial population constraint may assign an initial location score of 0.75 to Cell 2, an airspace constraint may assign a zero function of 0 to Cell 2, and a vegetation/ground cover constraint may assign a value of 0.4 to Cell 2. Accordingly, this would result in an overall location score of 0 for Cell 2 (e.g., 0.75*0*0.4). According to exemplary embodiments of the present disclosure, the location scores may be returned in the form of a data file, a map of the area of interest that graphically represents the location scores of each cell, another metric based on the determined location scores, and the like.

In step 516, the input parameters provided by the user may optionally be used as a feedback loop to update constraints, mapping functions, and/or other considerations that may be used in determining location scores, according to exemplary embodiments of the present disclosure.

Figure 6:
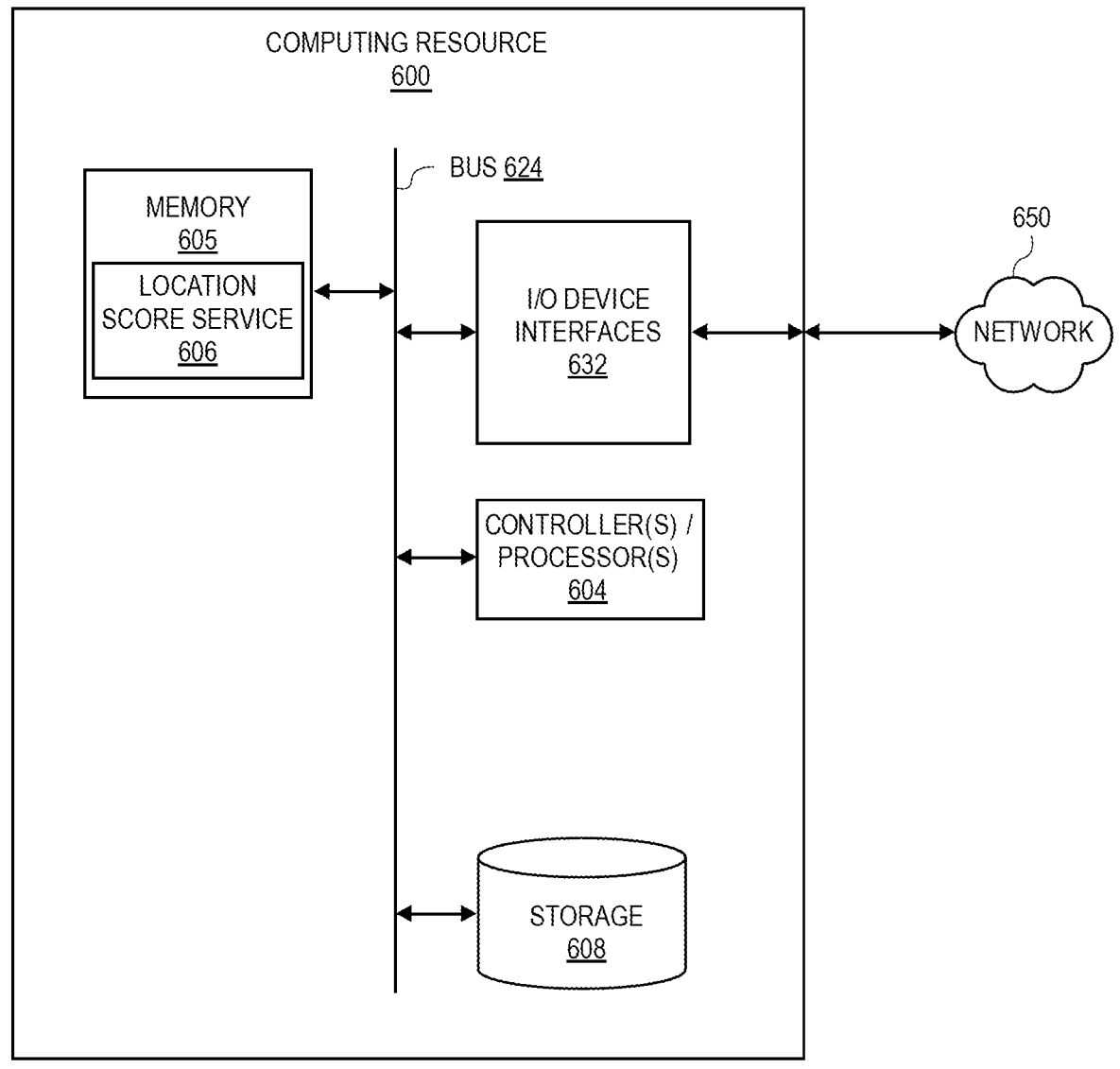
FIG. 6 is a block diagram of an exemplary computing resource, according to exemplary embodiments of the present disclosure.

FIG. 6 is a block diagram of components of computing resource 600 (e.g., computing resources 220, etc.) that may perform or provide the systems and methods, according to exemplary embodiments of the present disclosure.

Multiple such computing resources 600 may be included in the system. In operation, each of these devices (or groups of devices) may include computer-readable and computer-executable instructions that reside on computing resource 600, as will be discussed further below.

Computing resource 600 may include one or more controllers/processors 604, that may each include a CPU for processing data and computer-readable instructions, and memory 605 for storing data and instructions. Memory 605 may individually include volatile RAM, non-volatile ROM, non-volatile MRAM, and/or other types of memory. Computing resource 600 may also include a data storage component 608 for storing data, geographic area information, constraints, mapping functions, etc. Each data storage component may individually include one or more non-volatile storage types such as magnetic storage, optical storage, solid-state storage, etc. Computing resource 600 may also be connected to removable or external non-volatile memory and/or storage (such as a removable memory card, memory key drive, networked storage, etc.) through input/output device interfaces 632.

Computer instructions for operating computing resource 600 and its various components may be executed by the controller(s)/processor(s) 604, using memory 605 as temporary "working" storage at runtime. The computer instructions may be stored in a non-transitory manner in non-volatile memory 605, storage 608, or an external device(s). Alternatively, some or all of the executable instructions may be embedded in hardware or firmware on computing resource 600 in addition to or instead of software.

For example, memory 605 may store program instructions that, when executed by the controller(s)/processor(s) 604, cause the controller(s)/processors 604 to process an area of interest, geographical information, etc. using location score service 606 to generate location scores for an area of interest, as discussed herein.

Computing resource 600 also includes input/output device interfaces 632. A variety of components may be connected through input/output device interfaces 632. Additionally, computing resource 600 may include address/data bus 624 for conveying data among components of computing resource 600. Each component within computing resource 600 may also be directly connected to other components in addition to (or instead of) being connected to other components across bus 624.

The disclosed implementations discussed herein may be performed on one or more computing resources, such as computing resource 600 discussed with respect to FIG. 6 or performed on a combination of one or more computing resources. Further, the components of the computing resource 600, as illustrated in FIG. 6, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

The computers, servers, devices, computing resources and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device or method to interact with the computers, servers, devices and the like, or to "select" a control, link, node, hub or any other aspect of the present disclosure.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

The data and/or computer executable instructions, programs, firmware, software and the like (also referred to herein as "computer executable" components) described herein may be stored on a computer-readable medium that is within or accessible by computers or computer components such as computing resources 600 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/ machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "similar," or "substantially" as used herein, represent a value, amount, or characteristic close to the stated value, amount, or characteristic that still performs a desired function or achieves a desired result. For example, the terms "about," "approximately," "generally," "nearly." "similar," or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
receiving a geographic area of interest;
dividing the geographic area of interest into a plurality of cells;
applying a population constraint defined by a first mapping function to the plurality of cells to obtain a respective baseline location score for each cell of the plurality of cells;
applying a second constraint defined by a second mapping function to the respective baseline location scores associated with each cell of the plurality of cells to obtain a respective updated location score for each cell of the plurality of cells;
associating the respective updated location scores to the plurality of cells, wherein the respective updated location scores represent a suitability of performing aerial delivery of an item by an aerial vehicle to the plurality of cells based at least in part on a plurality of capabilities associated with the aerial vehicle and weather information associated with the plurality of cells;
initiating, based at least in part on the respective updated location scores, aerial delivery of the item to a location within the geographic area of interest;
receiving an updated second constraint for at least some of the plurality of cells;
applying the updated second constraint to the respective baseline location scores associated with each of the plurality of cells to obtain a second respective updated location score for each of the plurality of cells;
associating the second respective updated location scores to the plurality of cells; and
modifying, based at least in part on the second respective updated location scores, the aerial delivery of the item so that the aerial delivery of the item is performed to a second location in the geographic area of interest.

2. The computer-implemented method of claim 1, wherein the first mapping function includes a piecewise linear mapping function defined by a plurality of breakpoint location scores at corresponding population thresholds.

3. The computer-implemented method of claim 1, wherein the second constraint includes at least one of:
a weather constraint;
an airspace constraint;
a ground cover constraint;
a terrain classification constraint; or
an infrastructure constraint.

4. The computer-implemented method of claim 1, wherein the second mapping function includes a constant function.

5. A computing system, comprising:
one or more processors;
a memory including program instructions that, when executed by the one or more processors, cause the one or more processors to at least:
determine a plurality of constraints to be applied in generating a location score for a plurality of cells that form an area of interest in connection with provisioning of a service, wherein:

each constraint of the plurality of constraints is defined by a respective mapping function; and
the respective mapping functions are determined based at least in part on a plurality of capabilities associated with an aerial vehicle and a plurality of weather information associated with the plurality of cells;
apply the plurality of constraints as defined by the respective mapping functions to each cell of the plurality of cells so as to determine a respective location score for each cell of the plurality of cells, wherein the respective location scores for each cell of the plurality of cells represent a suitability of performing aerial delivery of an item by the aerial vehicle to the plurality of cells based at least in part on the plurality of capabilities associated with the aerial vehicle and the weather information associated with the plurality of cells;
return the respective location scores for each cell of the plurality of cells;
initiate, based at least in part on the respective location scores, aerial delivery of the item to a location within the area of interest;
determine a plurality of updated constraints based at least in part on at least one of updated capabilities associated with the aerial vehicle or updated weather information associated with the plurality of cells;
apply the plurality of updated constraints to determine a respective updated location score for at least a portion of the plurality of cells;
return the respective updated location scores for the plurality of cells; and
modify, based at least in part on the respective updated location scores, the aerial delivery of the item so that the aerial delivery of the item is performed to a second location in the area of interest.

6. The computing system of claim 5, wherein determination of the plurality of constraints and the respective mapping functions are based at least in part on the service.

7. The computing system of claim 5, wherein the plurality of constraints includes at least one of:
a population density constraint;
a weather constraint;
an airspace constraint;
a ground cover constraint;
a terrain classification constraint; or
an infrastructure constraint.

8. The computing system of claim 5, wherein the respective mapping functions include at least one of:
a piecewise linear mapping function; or
a constant mapping function.

9. The computing system of claim 5, wherein the service includes performing aerial delivery of items within the area of interest.

10. The computing system of claim 9, wherein each respective location score for each cell of the plurality of cells represents a likelihood that aerial delivery of items may be performed within each cell of the plurality of cells.

11. The computing system of claim 9, wherein at least one of the plurality of constraints or at least one of the respective mapping functions are determined based at least in part on parameters associated with an aerial vehicle performing the aerial delivery of items.

12. The computing system of claim 5, wherein the plurality of constraints includes:
a population density constraint defined by a piecewise linear mapping function;

a prohibited airspace constraint defined by a constant zero mapping function; and a permitted airspace constraint defined by a constant unity mapping function.

13. The computing system of claim 12, wherein the piecewise linear mapping function includes a plurality of location score breakpoints corresponding to a plurality of population density thresholds.

14. The computing system of claim 5, wherein the program instructions that, when executed by the one or more processors, further cause the one or more processors to at least:

convert information associated with a first constraint of the plurality of constraints from an original resolution to a resolution corresponding to the plurality of cells.

15. A method, comprising:

determining, based at least in part on providing aerial delivery of items, a first mapping function defining a population density constraint;

determining, for each cell of a plurality of cells forming an area of interest, a respective baseline location score by applying the first mapping function of the population density constraint to each cell of the plurality of cells forming the area of interest;

determining, for each cell of the plurality of cells forming the area of interest, a respective overall location score by applying a second mapping function of a further constraint to each cell of the plurality of cells forming the area of interest, wherein the second mapping function is based at least in part on a plurality of weather information associated with the plurality of cells;

initiating, based at least in part on the respective overall location scores, aerial delivery of an item to a location within the area of interest;

determining a second respective updated location score for at least a portion of the plurality of cells by applying an updated second mapping function to the plurality of cells forming the area of interest, wherein the updated second mapping function is based at least in part on a plurality of updated weather information associated with the plurality of cells; and modifying, based at least in part on the second respective updated location scores, the aerial delivery of the item so that the aerial delivery of the item is performed to a second location within the area of interest.

16. The method of claim 15, wherein each respective overall location score represents a likelihood that aerial delivery of items may be performed to each cell of the plurality of cells.

17. The method of claim 15, wherein the first mapping function includes a piecewise linear mapping function having a plurality of location score breakpoints corresponding to a plurality of population density thresholds.

18. The method of claim 15, wherein the further constraint includes at least one of:

a weather constraint;

a prohibited airspace constraint;

a permitted airspace constraint;

a ground cover constraint;

a terrain classification constraint; or an infrastructure constraint.

19. The method of claim 15, wherein the second mapping function includes at least one of:

a piecewise linear function;

a linear function;

a constant function;

a constant unity function; or a constant zero function.

20. The method of claim 15, wherein the area of interest may be defined by at least one of:

a postal code;

a terrain characteristic;

a city;

a state;

a country; or a continent.

* * * * *